J. A. ROTH.
Making Lamp Black.
No. 17,519.
Patented June 9, 1857.
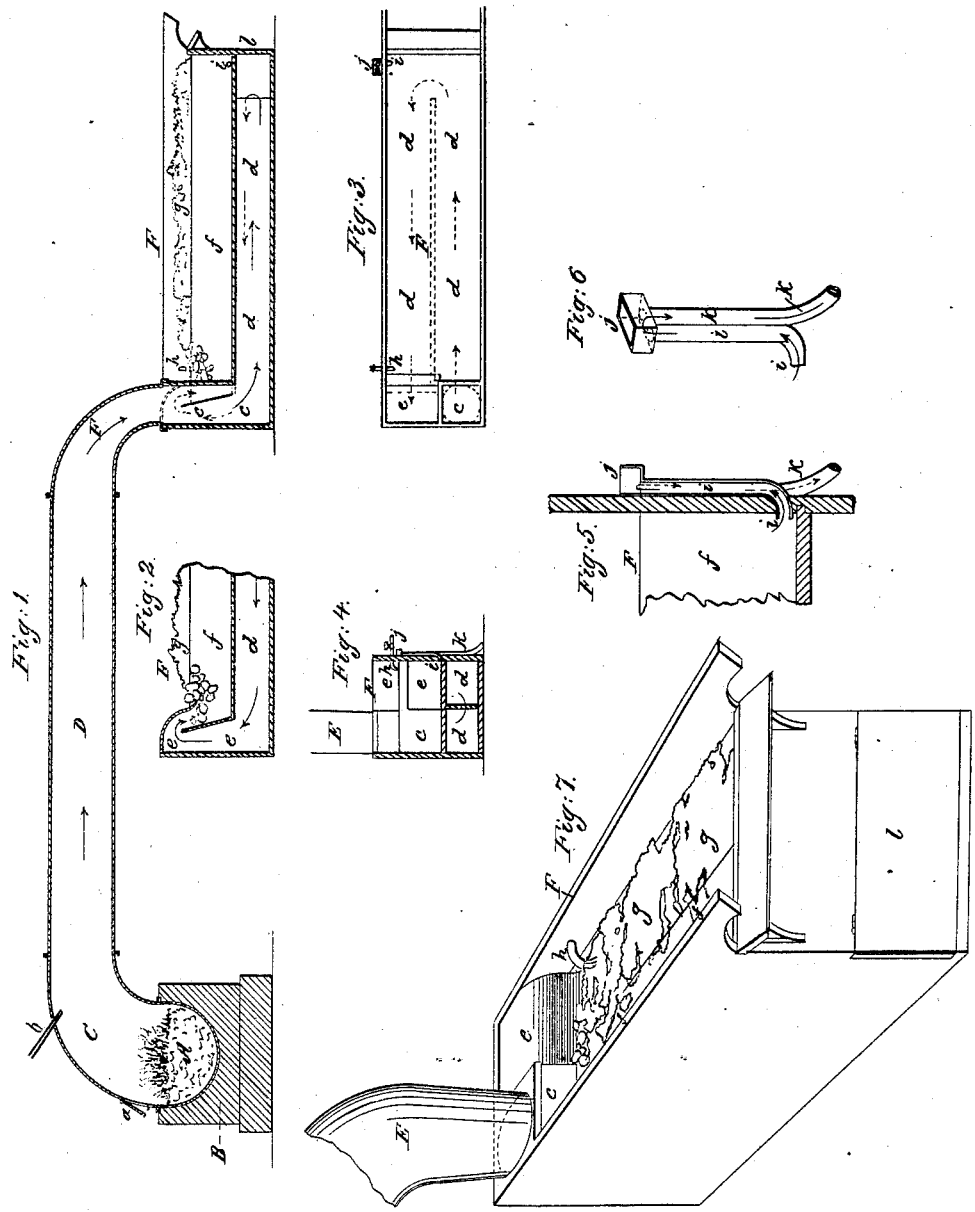

UNITED STATES PATENT OFFICE.

JULIUS A. ROTH, OF PHILADELPHIA, PENNSYLVANIA.

MAKING LAMPBLACK.

Specification of Letters Patent No. 17,519, dated June 9, 1857.

*To all whom it may concern:*

Be it known that I, JULIUS A. ROTH, of the city of Philadelphia and State of Pennsylvania, have discovered a new and useful Apparatus or Device for Manufacturing Lampblack; and I do hereby declare that the following is a clear and exact description thereof, reference being had to the annexed drawings and to the letters of reference marked thereon.

It has heretofore been customary in the manufacture of lamp black, to burn resinous substances in ovens, supplied either with ordinary doors or by the so called "air tight process," and then connecting said ovens by a flue with a spacious chamber or house, in which to collect the black. The chamber or house is generally supplied with a vent or chimney, so as to give a draft from the burning place, or oven, into and through the house or chamber, in which the black is collected. This draft is considered indispensable in the present art of making lamp black, although it causes much annoyance to the community residing in the neighborhood, as well as loss to the manufacturer. The air, in its passage from the house or chamber through the vent or chimney, carries a considerable quantity of black along, which escapes out of the house and is driven by the wind into and on the buildings of the neighborhood, thus blackening everything and place around the factory. Now, in order to avoid and remove said annoying and detrimental causes, I construct my ovens in any of the usual known forms with iron doors, well fitted in their frames, so as to shut tightly, and I supply the front part of the oven with one or more air pipes, through which atmospheric air is introduced under pressure, for the purpose of facilitating the combustion of the resinous material in the oven, as well as to create a pressure within the same. The oven is supplied with an iron flue of ordinary dimensions, through which the black is discharged from the oven, but, instead of leading said flue into a chamber or house, I supply the end of the same with a suitable metallic pipe, by which to convey the black into a tank or reservoir, filled with water, the extreme end of said pipe being placed under the surface of the water to such a depth, as the pressure from the oven is capable to overcome. The lamp black is thus forced into the water of the tank but owing to its oily nature and therefore non affinity, it does not unite with the water, but is lifted upward on the surface of the same, from where it may be run into barrels or boxes for packing.

In order to more fully explain to those skilled in the art of manufacturing lamp black I will here proceed to describe the annexed drawings, referring to the letters marked thereon.

Letter A (Figure 1,) represents the kettle, in which the resinous materials are burning.

B (Fig. 1) represents the masonry, which supports and surrounds the kettle.

C (Fig. 1) is an iron neck, attached to the kettle and communicating with the flue D (Fig. 1).

E (Figs. 1, 4 and 7) represents the attachment to the flue D, by which the black is conducted into the tank F (Figs. 1, 2, 3, 4 and 7); the black then passes through the flues $c$ $c$ and $d$ $d$ underneath the water in the tank or reservoir where the black is cooled and rises through the flue $e$ $e$ to the upper part of the tank, the top of which flue is bent in such a manner, as to discharge the black below the surface of the water, as represented in Figs. 1 and 2.

$a$ (Fig. 1) represents the charging door to the kettle.

A, $b$ (Fig. 1) represents the blow pipe, through which atmospheric air is forced into the flue D.

$f$ (Figs. 1, 2, 3, 4, 5) represents the water in the tank or reservoir F.

$g$ $g$ $g$, (Figs. 1, 2 and 7) represents the lamp black, floating on the surface of the water.

$h$, (Figs. 1, 3, 4 and 7) represents a water cock, for the introduction of cold water into the tank.

$i$ (Figs. 1, 3, 4, 5 and 6) is a pipe, conveying the water out of the tank up to the box $j$, which is placed even with the level of the desired water level, so as to prevent the water in the tank from rising above the same, and $k$ represents the waste pipe from the box $j$, as shown in Figs. 4, 5 and 6,

*l* (Figs. 1 and 7) is a door at the end of the tank to clean out the flues *d d*.

What I claim as my invention, and desire to secure by Letters Patent, consists in supplying lamp black ovens or the flues, connected therewith with air pipes substantially as described, and I also claim the combination of the discharging flue or pipe with a tank or reservoir, filled with water for the purpose substantially as described.

J. A. ROTH.

Witnesses:
CHARLES D. FREEMAN,
WM. C. GAW.